(12) United States Patent
Lesage et al.

(10) Patent No.: US 7,711,165 B2
(45) Date of Patent: May 4, 2010

(54) SYSTEM AND METHOD FOR CORONARY ARTERY SEGMENTATION OF CARDIAC CT VOLUMES

(75) Inventors: David Lesage, Chevigny-Saint-Sauveur (FR); Matthias Rasch, Lonnerstadt (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 958 days.

(21) Appl. No.: 11/489,372

(22) Filed: Jul. 19, 2006

(65) Prior Publication Data

US 2007/0031019 A1    Feb. 8, 2007

Related U.S. Application Data

(60) Provisional application No. 60/703,187, filed on Jul. 28, 2005.

(51) Int. Cl.
*G06K 9/00* (2006.01)
(52) U.S. Cl. .................. 382/128; 382/173; 382/131; 382/132; 128/920; 128/922
(58) Field of Classification Search ............... 382/100, 382/128, 130, 168–172, 173, 190, 195, 199, 382/254, 256, 259, 270; 128/920, 922

See application file for complete search history.

(56) References Cited

U.S. PATENT DOCUMENTS 5,268,967 A * 12/1993 Jang et al. .................. 382/132

OTHER PUBLICATIONS

Aylward et al. (Initialization, Noise, Singularities, and Scale in Height Ridge Traversal for Tubular Object Centerline Extraction, Feb. 2002, IEEE Transactions on Medical Imaging, vol. 21, No. 2.*
Antiga et al. (Automatic Generation of Glomerular Capillary Topological Organization, 2001, Microvascular Research, vol. 62, pp. 346-354).*

(Continued)

*Primary Examiner*—Andrew W Johns
*Assistant Examiner*—Jason Heidemann
(74) *Attorney, Agent, or Firm*—Donald B. Paschburg; F. Chau & Associates, LLC

(57) ABSTRACT

A method for segmenting coronary vessels in digitized cardiac images includes providing a digitized cardiac image, providing a seed point in the image, selecting a volume-of-interest about the seed point, performing a local segmentation in the volume-of-interest, including initializing a connected component with the seed point and a threshold intensity value to the intensity of the seed point, adding a point to the connected component if the point is adjacent to the connected component and if the intensity of the point is greater than or equal to the threshold value, lowering the threshold intensity value, and computing an attribute value of the connected component, wherein if a discontinuity in the attribute value is detected, the local segmentation is terminated, wherein a local segmentation mask of a vessel is obtained.

26 Claims, 12 Drawing Sheets

OTHER PUBLICATIONS

Al-Kofahi et al. (Rapid Automated Three-Dimensional Tracing of Neurons From Confocal Image Stacks, IEEE Transactions On Information Technology in Biomedicine, vol. 6, No. 2, Jun. 2002).*

Bouix et al. (Flux driven automatic centerline extraction, 2004, Medical Image Analysis 9, pp. 209-221).*

Chen et al. (Automatic 3D vascular tree construction in CT angiography, Computerized Medical Imaging and Graphics 27, 2003, pp. 469-479).*

Cline et al. (3D MR Coronary Artery Segmentation, 1998, Lippincott Williams & Wilkins, MRM 40, p. 697-702).*

Dhawan et al. (Knowledge-Based 3D Analysis from 2D Medical Images, 1991, IEEE Engineering In Medicine And Biology, pp. 30-37).*

Farag et al. (Reliable Fly-Throughs of Vascular Trees, 2004, Technical Report, Department of Electrical and Computer Engineering, University of Louisville).*

Flasque et al. (Acquisition, segmentation and tracking of the cerebral vascular tree on 3D magnetic resonance angiography images, 2001, Medical Image Analysis, vol. 5, pp. 173-183).*

Higgins et al. (System for Analyzing High-Resolution Three-Dimensional Coronary Angiogram, 1996, IEEE Transactions On Medical Imaging, vol. 15, No. 3).*

Jiang et al. (Adaptive Local Thresholding by Verification-Based Multithreshold Probing with Application to Vessel Detection in Retinal Images, 2003, IEEE Transactions on Pattern Analysis And Machine Intelligence, vol. 25, No. 1).*

Manniesing et al. (Local Speed Functions in Level Set Based Vessel Segmentation, 2004, MICAI 2004, pp. 475-482).*

O'Brien et al. (Automated Segmentation of Coronary Vessels in Angiographic Image Sequences Utilizing Temporal, Spatial and Structural Constraints, 1994, Spatial and Structural Constraints, in: Proceedings of SPIE Visualization in Biomedical Computing, pp. 25-37.*

Yim et al., (Gray-Scale Skeletonization of Small Vessels in Magnetic Resonance Angiography, 2000, IEEE Transactions On Medical Imaging, vol. 19, No. 6).*

* cited by examiner (a)

(b)

(c)

V   sub-volume of interest
S   inner sphere
•   original seed points
o   new seed points
--  medial line
▨   validated segmentation

| Label | Proc. time | Mask size | Result |
|---|---|---|---|
| LCA-LCX 1 | 5.4 sec. | 14900 vox. | Fig. 10 upper left |
| RCA 1 | 7.9 sec. | 36250 vox. | Fig. 10 upper right |
| LCA-LCX 2 | 23 sec. | 72700 vox. | Fig. 10 lower left |
| RCA 2 | 19.3 sec. | 61900 vox. | Fig. 10 lower right |

FIG. 11

SYSTEM AND METHOD FOR CORONARY ARTERY SEGMENTATION OF CARDIAC CT VOLUMES

CROSS REFERENCE TO RELATED UNITED STATES APPLICATIONS

This application claims priority from "Coronary Artery Segmentation on Cardiac CT Volumes", U.S. Provisional Application No. 60/703,187 of Lesage, et al., filed Jul. 28, 2005, the contents of which are incorporated herein by reference.

TECHNICAL FIELD

This invention is directed to segmentation of digitized medical images.

DISCUSSION OF THE RELATED ART

Blood vessel segmentation is important for clinical tasks such as diagnosis of vascular diseases, surgery planning and blood flow simulation. Although this field has been widely explored in the past, no solution has proved to be fully satisfactory for the segmentation of CT coronary arteries.

Research in the cardiovascular imaging field is motivated by the number of people suffering from related diseases. Congestive heart failure, resulting from blocked coronary arteries, is of particular concern. Nearly 5 million American people already have congestive heart failure and about 550,000 develop it each year.

Modem imaging developments, such as Computed Tomography (CT) and Magnetic Resonance Imaging (MRI) have made possible the acquisition of high definition volumes where arteries can be accurately visualized. Such volumetric techniques have become an attractive alternative to conventional, highly invasive 2D coronary angiography. However, due to the constantly increasing volume of generated data, the amount of computation needed to extract relevant information quickly becomes prohibitive. In order to reduce the manual intervention of medical professionals and thus lower inter-operator variability, a large variety of automatic and semi-automatic methods for vessel segmentation have been proposed in the past. FIG. 1 illustrates an exemplary coronary artery tree in a volume rendered cardiac CT angiogram. As shown in the figure, starting from the ascending aorta are the right coronary artery (RCA), the left coronary artery (LCA), and the left circumflex coronary artery (LCX). Unfortunately, the segmentation of coronary arteries on cardiac CT volumes remains a challenging problem due to different issues:

(1) anatomical complexity, due to the small size of target arteries, branchings and curvature, proximity of surrounding structures, high inter-patient variability and possible anomalies;

(2) acquisition issues, such as noise, the partial volume effect, resolution and contrast agent inhomogeneity.

Examples of these anatomical and acquisition issues in FIGS. 2(a)-(c). FIG. 2(a) illustrates noise and resolution problems inside the boxed region, FIG. 2(b) depicts heart chambers proximity combined with contrast agent artifacts, and FIG. 2(c) illustrates different anatomical anomalies, such as calcification, stenosis, and aneurysm, and a stent. FIG. 3 illustrates an example of intensity evolution in a vessel. Due to the inhomogeneous repartition of the contrast agent, intensity drops along the vessel.

Coronary characteristics vary in such a way that it is challenging to define a unique inter- (or even intra-) patient model to detect these characteristics robustly. For example, the global maximum a posteriori estimation of the image histogram often fails to separate arteries from the neighboring blood-filled heart chambers, leading to massive over-segmentation, and frequently undersegments darker (smaller) artery branches. More generally, simple methods such as global intensity or gradient thresholding are prone to failure in the coronary segmentation. A possible solution is to use heuristics to locally adapt the method's parameters. For example, empirical rules can automatically adapt a local intensity threshold to avoid both under- and over-segmentation. Alternatively, intrinsically local and adaptive detection methods, such as multiscale vessel filters can be used to model the vessel intensity distribution as a variation of the local contrast detectable at a certain scale. These models cover a wide range of size and contrast cases, but at a computational cost that can quickly become prohibitive, depending on the number of scales involved. A recent alternative can be found in connected-filter theory, where a scale independent elongation attribute based on the moment of inertia is used to perform vessel enhancement through attribute-thinning on a max-tree representation.

SUMMARY OF THE INVENTION

Exemplary embodiments of the invention as described herein generally include methods and systems for a locally adaptive method for the segmentation of coronary arteries from cardiac CTA volumes. Given a user-provided seed-point at the arterial root, an algorithm according to an embodiment of the invention automatically retrieves the entire arterial tree by combining successive local segmentations. Vessel segments are extracted by an automatic threshold selection with a connected-filter-like approach, followed by post-processing steps which are performed within a fast level-set framework. A skeletonization process extracts an approximate vessel centerline, providing new seed points to re-launch the algorithm. A method according to an embodiment of the invention can be easily implemented and can produce robust and accurate segmentation for a very limited time and memory cost, and requires one parameter, a "local volume jump threshold", which can be set intuitively with regard to the size of target structures. Furthermore, a method according to an embodiment of the invention induces a limited cost in processing time and memory, typically less than 20 sec and 10 MB on average, on a 1.5 GHz Pentium IV with 1 GB RDRAM. By combining a method according to an embodiment of the invention with other aorta segmentation methods, a one-click segmentation of the entire aorta and coronary tree can be achieved. Provided one seed point, a dedicated algorithm can robustly and quickly extract the aorta and detect the aortic valve and the coronary branchings. A segmentation method according to an embodiment of the invention can be launched automatically to retrieve both coronaries. The entire process can take as little as 10 to 40 seconds on average.

According to an aspect of the invention, there is provided a method for segmenting coronary vessels in digitized cardiac images including the steps of providing a digitized cardiac image comprising a plurality of intensities corresponding to a domain of points on an N-dimensional grid, providing a seed point in said digitized image, selecting a volume-of-interest about said seed point, performing a local segmentation in said volume-of-interest, including initializing a connected component with said seed point and a threshold intensity value to the intensity of the seed point, adding a point to said connected component if said point is adjacent to said connected component and if the intensity of said point is greater than or equal to the threshold value, lowering said threshold intensity value, and computing an attribute value of said connected component, wherein if a discontinuity in said attribute value is detected, said local segmentation is terminated, wherein a local segmentation mask of a vessel is obtained.

According to a further aspect of the invention, the steps of adding a point to said connected component, lowering said threshold intensity value, and computing an attribute value are repeated for all points in said volume of interest until said segmentation is terminated.

According to a further aspect of the invention, if an attribute value discontinuity is not detected, discarding the volume of interest.

According to a further aspect of the invention, the attribute value is selected from a list including a volume of said connected component, a local ball measure of said connected component, and a moment of inertia of said connected component.

According to a further aspect of the invention, detecting an attribute value discontinuity comprises calculating a first derivative of said attribute with respect to said threshold intensity value, comparing said first derivative value to a threshold derivative value, wherein if said first derivative value is greater than said threshold derivative value, a discontinuity has been detected.

According to a further aspect of the invention, the method comprises adjusting said threshold derivative value based on a current threshold intensity value and a previous threshold intensity value.

According to a further aspect of the invention, the method comprises smoothing points added to said connected component with a bilateral filter.

According to a further aspect of the invention, the method comprises eliminating any holes in said segmentation mask, disconnecting leakage points from said segmentation mask, wherein said leakage points are not part of said vessel, and smoothing the surface of said segmentation mask.

According to a further aspect of the invention, eliminating holes and disconnecting leakage points from said segmentation mask comprises initializing an outer boundary of said segmentation mask, initializing an inner boundary of said segmentation mask, switching points between said outer boundary and said inner boundary for a predetermined number of iterations, and convolving said inner boundary and said outer boundary with a Gaussian kernel.

According to a further aspect of the invention, the local segmentation mask is obtained by retrieving points in said connected component that are inside a sphere contained within said volume-of-interest.

According to a further aspect of the invention, the method comprises merging said local segmentation mask with a global segmentation mask.

According to a further aspect of the invention, the method comprises selecting a new seed point, wherein selecting a new seed point comprises thinning said segmentation mask by removing points that are not end points or are not non-simple points wherein a medial line is obtained, wherein an end point has only one 26-adjacent neighbor point and a non-simple point is a point whose removal alters the topology of the segmentation mask, selecting point on the medial line that is closest to said seed point, following said medial line until said medial line crosses an inner sphere contained within said volume-of-interest, and selecting said crossing point as the new seed point.

According to a further aspect of the invention, the steps of selecting a volume-of-interest, performing a local segmentation, and selecting a new seed point are repeated until a new seed point cannot be selected.

According to another aspect of the invention, there is provided a program storage device readable by a computer, tangibly embodying a program of instructions executable by the computer to perform the method steps for segmenting coronary vessels in digitized cardiac images.

BRIEF DESCRIPTION OF THE DRAWINGS

FIG. 11 is a table of results statistics for the figures of FIG. 10, according to an embodiment of the invention.

DETAILED DESCRIPTION OF THE PREFERRED EMBODIMENTS

Exemplary embodiments of the invention as described herein generally include systems and methods for local and adaptive tracking algorithm. To account for the variability of the characteristics (size, intensity distribution) along the vessel, local segmentations are combined in small sub-volumes of interest, performed by an adaptive thresholding process. These local masks are post-processed using mathematical morphology and smoothing techniques and the approximate vessel centerline is extracted in order to determine new seed points to re-launch the process.

Figure 1:
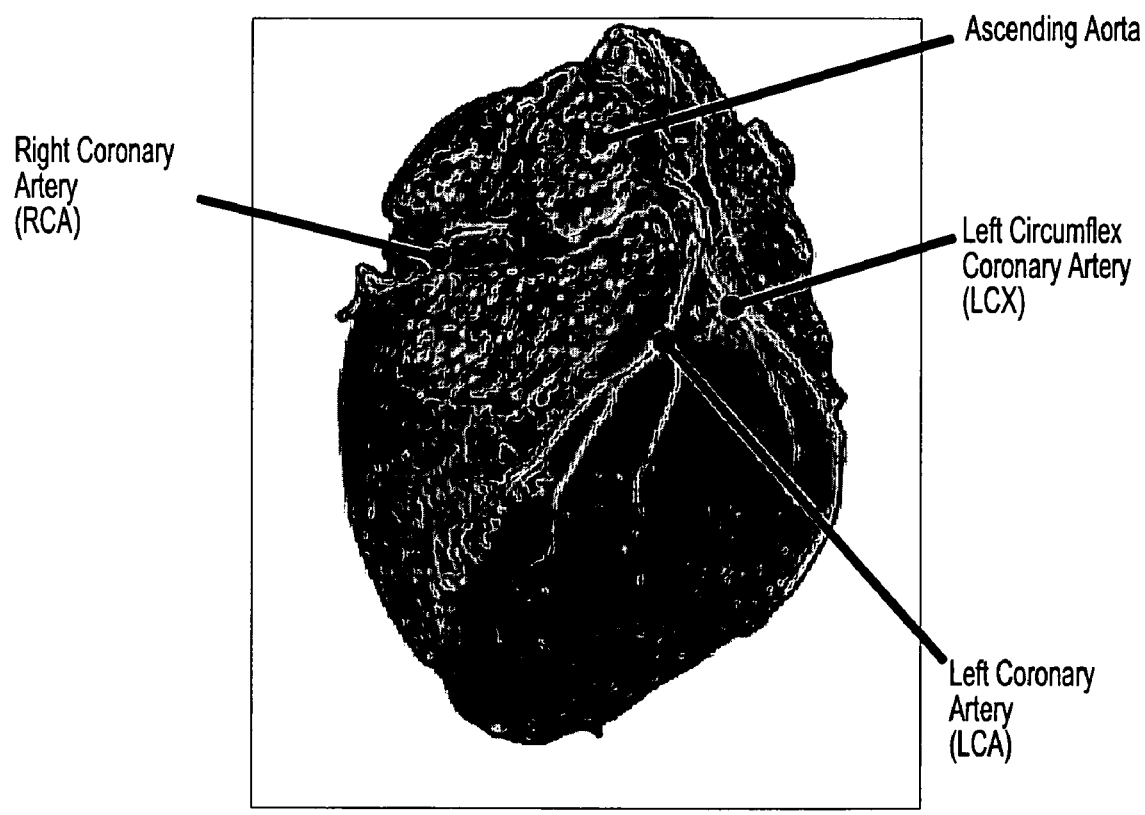
FIG. 1 illustrates an exemplary coronary artery tree in a volume rendered cardiac CT angiogram.
Figure 2:
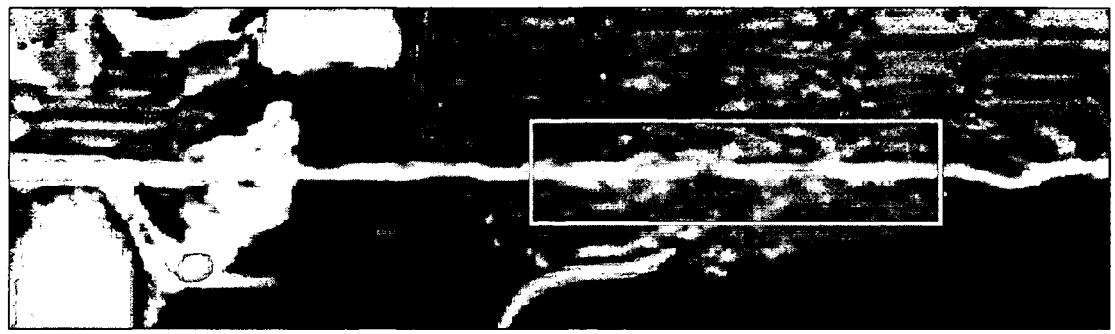
FIGS. 2(a)-(c) depicts examples of anatomical and acquisition issues in the segmentation of coronary arteries on cardiac CT volumes.
Figure 2:
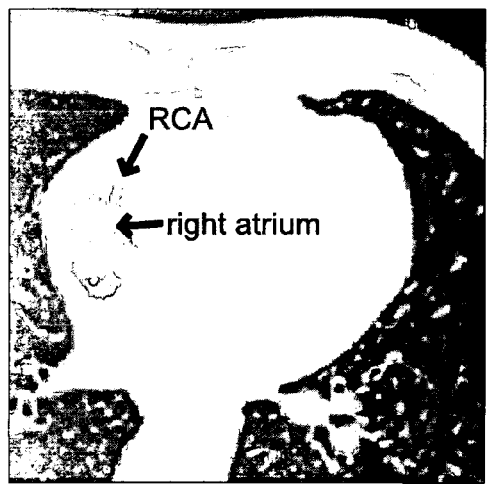
Figure 2:
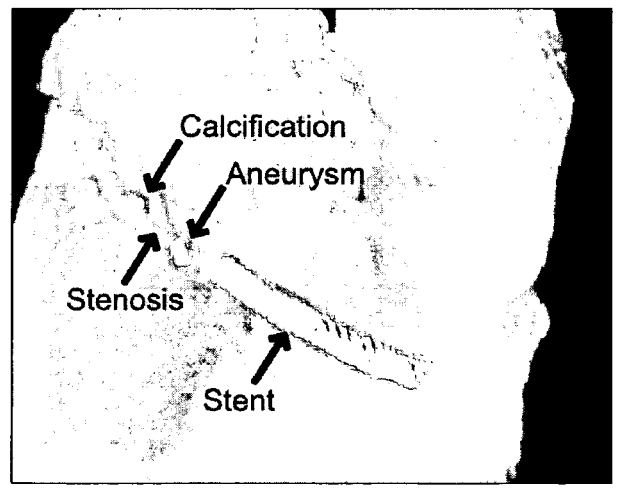
Figure 3:
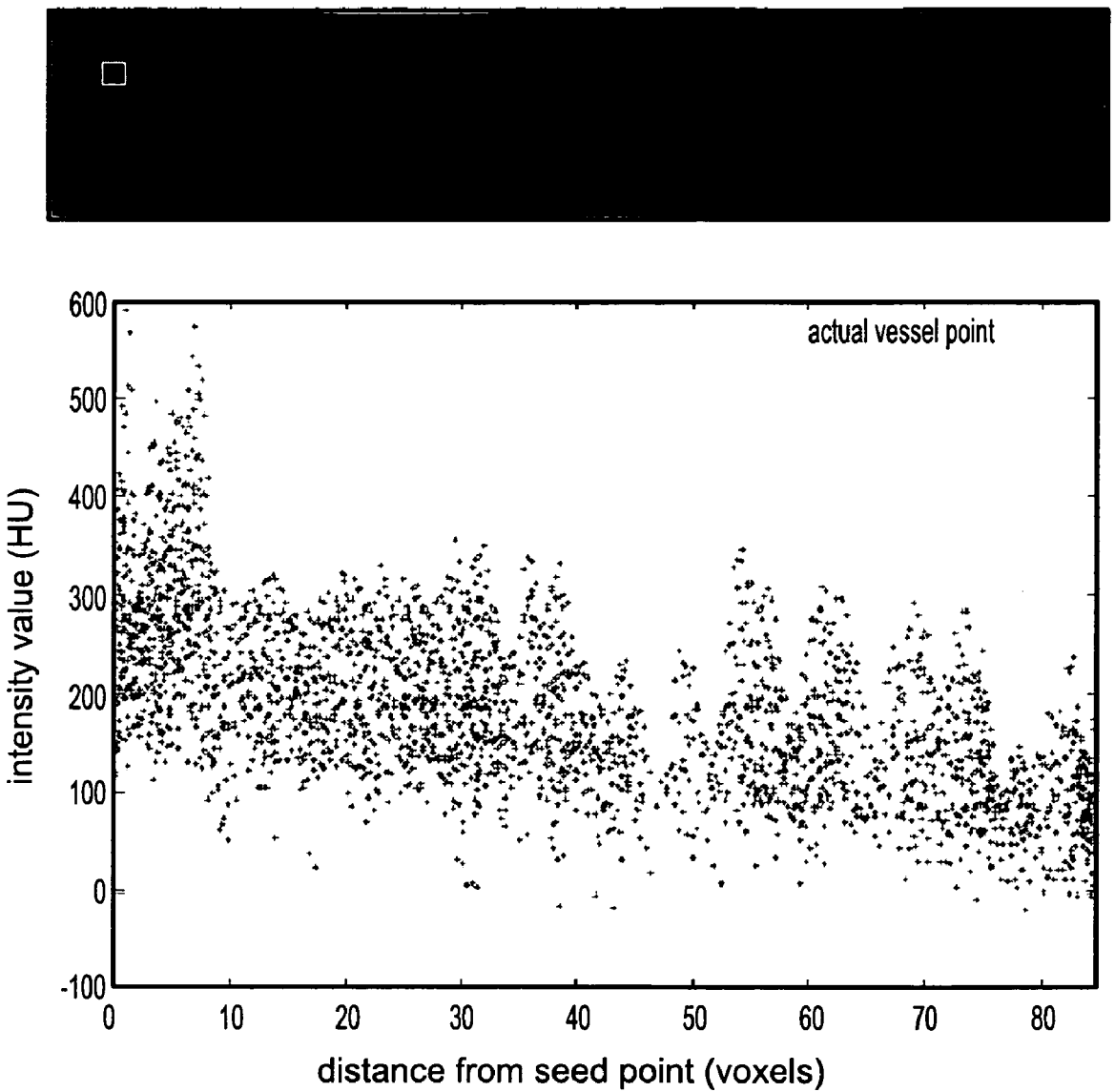
FIG. 3 illustrates an example of intensity evolution in a vessel.
Figure 4:
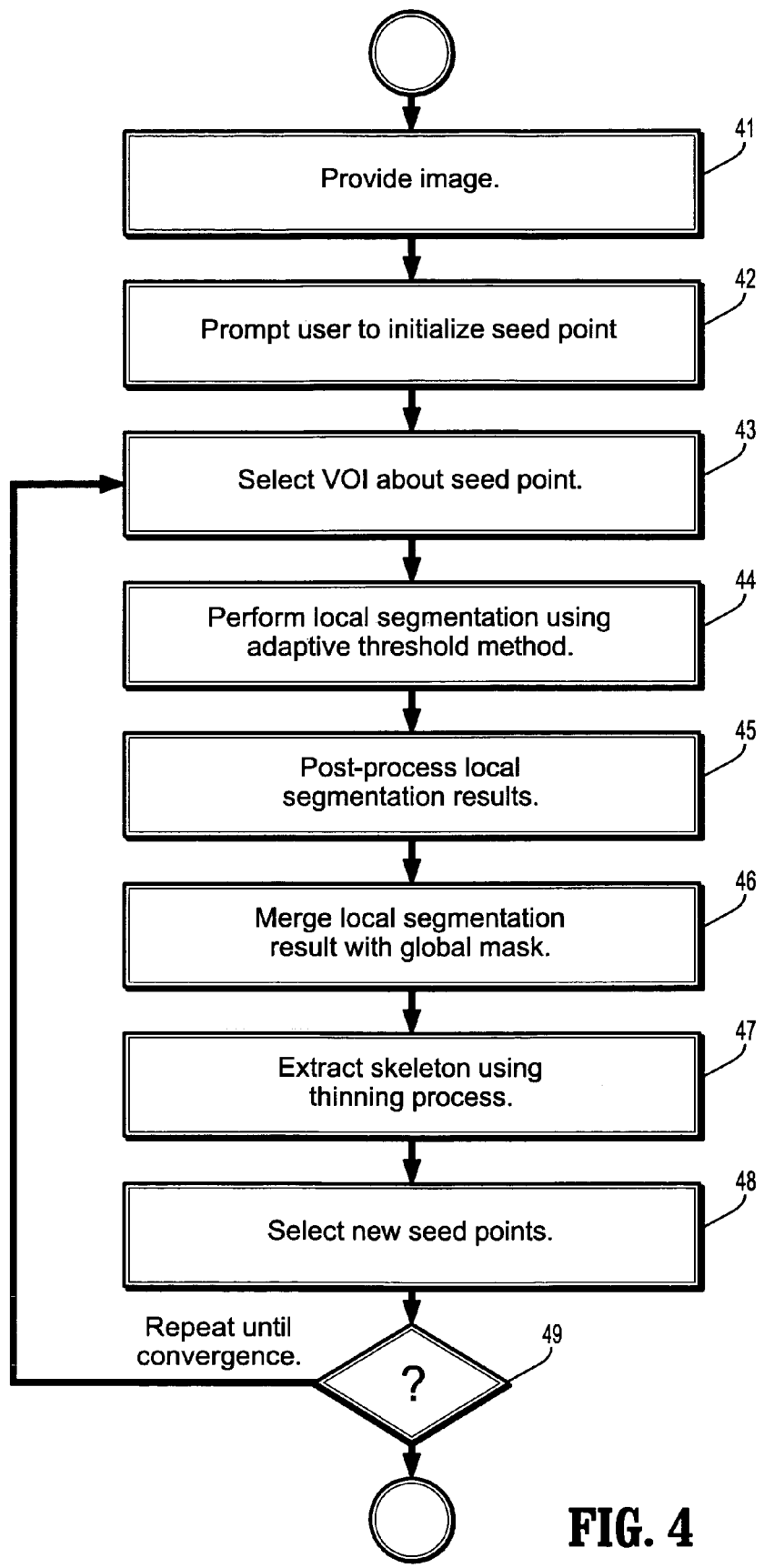
FIG. 4 depicts a flow chart of a coronary segmentation method according to an embodiment of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image:

A flow chart of a coronary segmentation method according to an embodiment of the invention is depicted in FIG. 4. Referring now to the figure, a cardiac image is provided at step 41, followed by initialization at step 42, where a user is prompted to manually set an original seed point at the root of the vessel of interest. In addition, a global segmentation mask that keeps track of the on-going segmentation is initialized to empty. Local segmentation is now performed, including selecting a sub-volume of interest (VOI) around the seed point at step 43 and performing a local segmentation using an adaptive thresholding method at step 44. The initial segmentation is post-processed at step 45 using morphological operations and smoothing performed within a level-set scheme. The local segmentation result is merged with the global mask at step 46. Skeletonization and new seed points extraction can now be performed, starting with a thinning process applied to the level-set to extract its skeleton at step 47, and, at step 48, the selection of new seed points among skeleton points at a certain distance from the initial seed point. The process loops at step 49 to repeat steps 43 through 48 with new seed points until convergence, i.e. until there is no new seed point found. New seed points lying in an already segmented region are discarded to avoid cycling. Eventually, the final result is the direct combination of local segmentations. The details of these steps are described below.

Local Segmentation

In a local segmentation method according to an embodiment of the invention, given a seed point in the vessel, the associated vessel component is extracted. This extraction process is constrained to a small sub-volume of interest (VOI) and thus only considers the local vessel segment. The VOI is chosen (FIG. 4, step 43) so that, centered on the vessel seed point, it can contain a significant, recognizable part of the target structure. It is desirable to be able to discriminate vessel and non-vessel regions. In addition, the VOI should be small enough so that some assumptions upon the homogeneity of the local vessel part can hold, such as a Gaussian intensity distribution, almost constant radius and low curvature.

For coronary arteries, vessel widths typically range from 1 to 5 mm. According to an embodiment of the invention, a 20 mm squared box centered on the seed point is chosen, so that the vessel should occupy only a small portion (less than 10%, assuming a cylinder model and possible branching) of the sub-volume.

Figure 5:
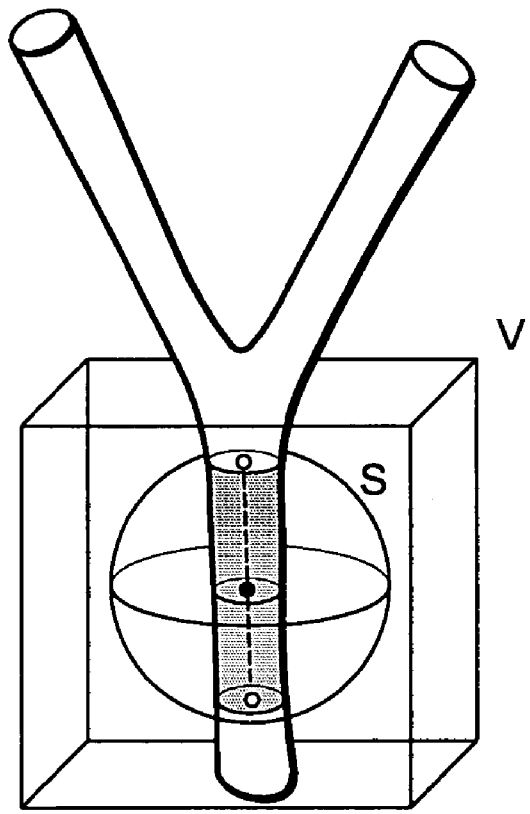
FIG. 5 depicts local segmentation and re-seeding, according to an embodiment of the invention.

FIG. 5 depicts local, segmentation and re-seeding, according to an embodiment of the invention. The local segmentation is constrained to a sub-volume V centered on the original seed point s. That part of the segmentation within the inner sphere S is added to the global mask. A thinning process extracts the medial line. Points lying on both the medial line and S are selected as new seed points to restart the algorithm.

In an adaptive thresholding segmentation according to an embodiment of the invention (FIG. 4, step 44), given a seed point s in the vessel, the segmentation aims at extracting the vessel component $c^*_s$ connected to s and lying within a VOI V. It can be assumed that, locally, the intensity follows a Gaussian distribution and that the vessel is brighter than its background. A rough approximation of $c^*_s$ can be extracted using a simple automatic threshold selection.

At a given threshold t, the connected component $c_{s,t}$ attached to s is defined as follows:

$$c_{s,t} = \{x \in V | \text{value}(x) \geq t\},$$

where $c_{s,t}$ is the connected component attached to s that includes only voxels whose values are greater than or equal to t. The value(x) is typically the intensity value associated with the voxel, either from the original data or as a result of a pre-processing step (described below). A flooding, region-growing process starting from $t=t_{max}=\text{value}(s)$, with t decreasing, constructs the set $C_s=\{c_{s,t}\}$. This flooding technique is efficient because any voxel in V is considered only once during the entire flooding process. The threshold t is decreased step by step, to cover all possible values of the digitized data.

A flooding, region-growing process according to an embodiment of the invention is a variation of the max/min tree algorithm. The min/max tree algorithm provides a queue-based method of constructing the so-called min- or max-tree from a given image. In the max-tree approach, an image is seen as a pile from lower to higher intensity levels. Higher level connected components are included into lower level ones. The max-tree is the formalization of this conception of an image, where nodes of the tree are connected components over a certain threshold and edges represent inclusion relations. This representation is well-suited for describing images where objects are brighter than their surrounding, as in the case of contrast-enhanced angiography. The complementary version, the so-called min tree, considers dark objects included in bright background.

Min/max trees can be used for morphological filtering in the framework of so-called connected filters. These trees encode the entire image, which can be straightforwardly reconstructed, and provide efficient ways of filtering images connected components by simply processing the tree representation. An exemplary, non-limiting workflow is as follows: (1) the tree is constructed from the image; (2) filtering is applied on the tree given some criterion (area, perimeter, entropy), and encoding the filtering in modifications applied to the tree (typically, node pruning); and (3) the filtered image is reconstructed from filtered tree.

According to an embodiment of the invention, a partial max-tree is constructed. The user- or automatically-selected seed point for local segmentation is considered as the leaf of a branch of our max-like tree, as it should be a point in a bright object. In a region-growing queue-based approach, inclusion relations to lower level components are retrieved. In other words, one grows from the given seed with decreasing threshold and keeps track of connected components and intensity steps as nodes and inclusion relations, respectively.

Once the inclusion tree/branch has been retrieved, filtering is not applied on it, but rather variations of criteria (such as area/volume) along the branch are analyzed. Such techniques are known as granulometry analysis in mathematical morphology. The leaf component, which includes the seed point, is typically of high intensity and small area/volume. While traversing the tree from the leaf to the root, connected components of lower intensity and higher area/volume, are encountered. Geometrically, it is desired to detect the discontinuity that occurs when reaching the background component. While still in the vessel, connected components are of high intensity and small area. When reaching the background, intensity lowers suddenly and area/volume explodes. This explosion pattern provides a criteria to select the last component as a preliminary segmentation before performing further refinements.

According to an embodiment of the invention, it is desired to find the best approximation $c^*_{s,t} \in C_s$ for $c^*_s$. A proper threshold can be found by compute shaping and/or appearance attributes on $c_{s,t}$ for each value of t. An exemplary, non-limiting attribute is the volume of $c_{s,t}$.

Figure 6:
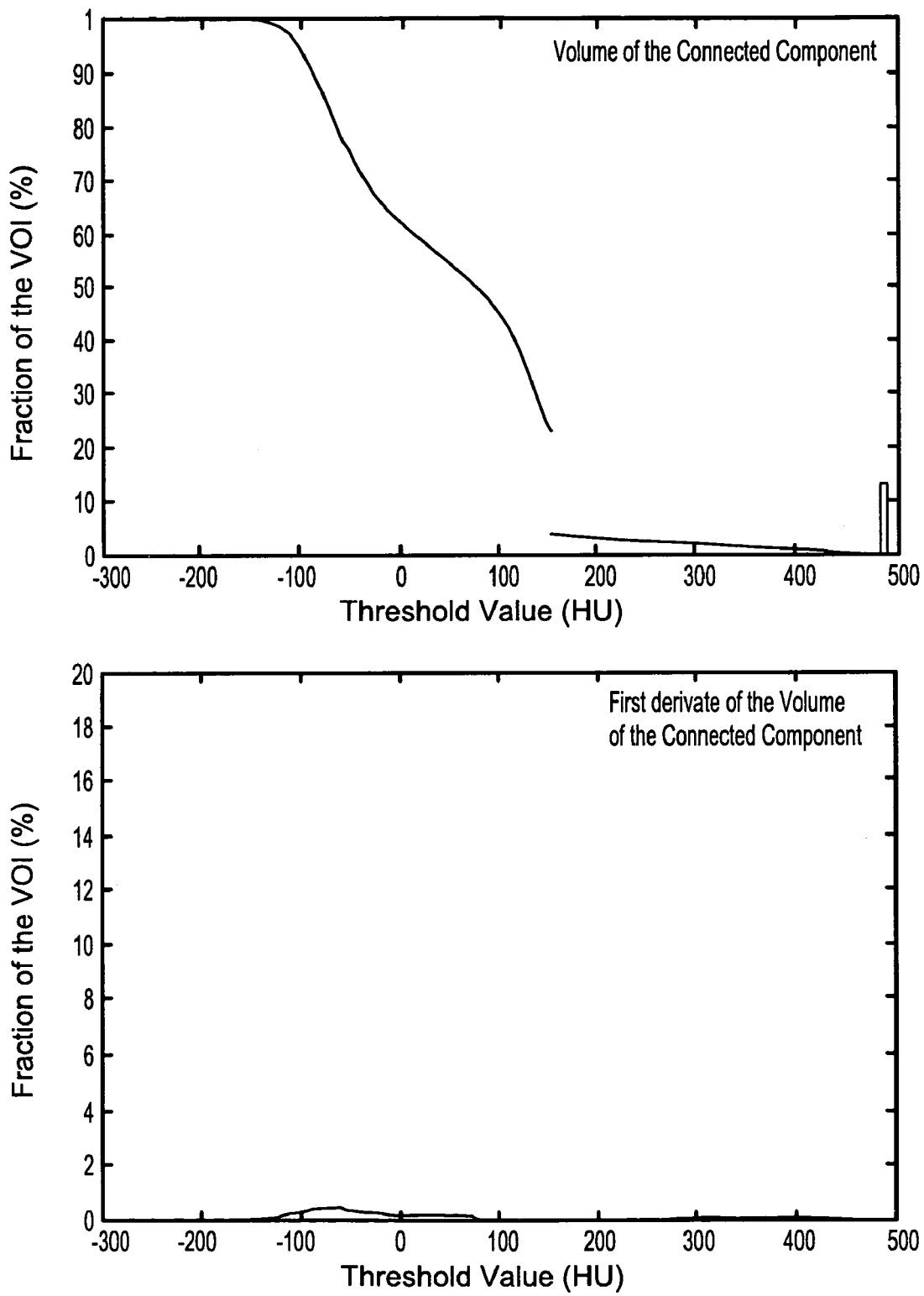
FIG. 6 depicts a volume of $c_{s,t}$ with respect to t, and its first derivative, according to an embodiment of the invention.
Figure 7:
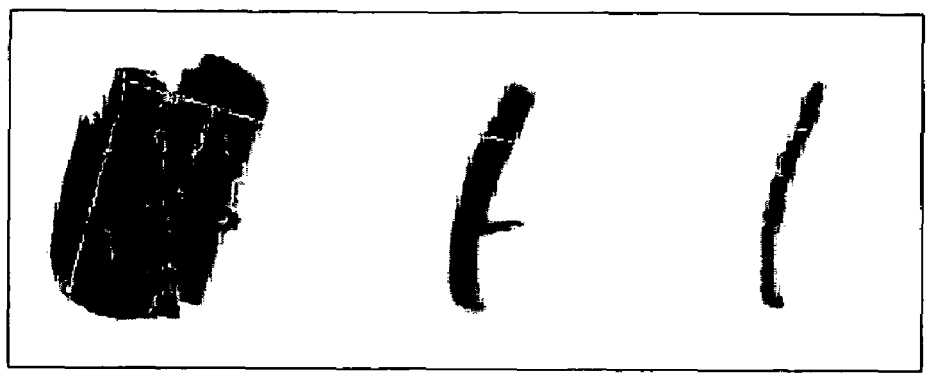
FIG. 7 depicts some examples of $c_{s,t}$, according to an embodiment of the invention.

FIG. 6 depicts a typical evolution of volume volume($c_{s,t}$)= f(t) with respect to t in the upper panel, and its first derivative in the lower panel, according to an embodiment of the invention. Note that a discontinuity appears for t=153 HU, corresponding to a leakage from the vessel to the background and/or surrounding structures. FIG. 7 depicts some examples of extracted components $c_{s,t}$, as a function of threshold. From left to right, the extracted connected components are: $c_{s,100}$, $c_{s,200}$ and $c_{s,400}$, corresponding to the threshold values in the graph of FIG. 6. By lowering the threshold, $c_{s,t}$ includes more and more vessel voxels, until it reaches the background (myocardium) intensities or leaks into intensity-similar surrounding structures, such as blood-filled ventricles. In either case, a discontinuity can be observed and detected. When the volume jump appears at a threshold t', the algorithm selects $c^*_{s,t'} = c^*_{s,t'+1}$ as an initial segmentation. If a seed point is given in the background or any other large, non-vessel area, such a discontinuity pattern will not occur and the VOI can be discarded, ensuring the convergence of the algorithm.

Figure 8:
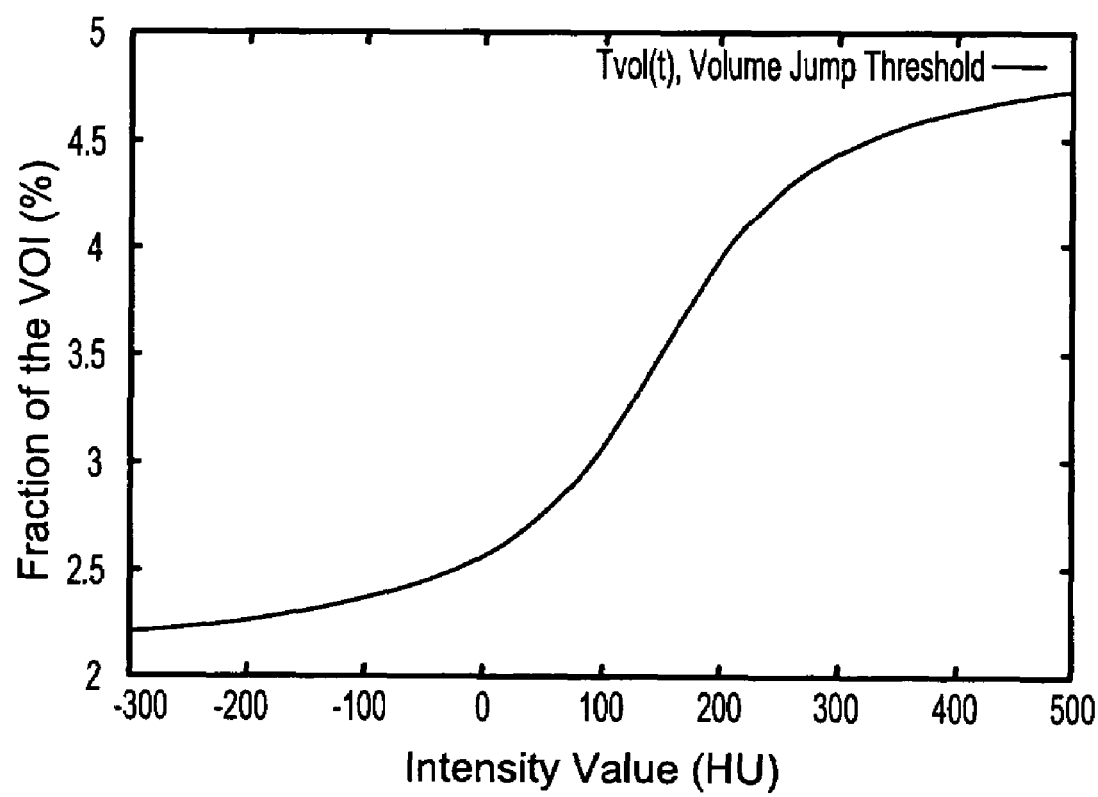
FIG. 8 illustrates the variation of $T_{vol}(t)$ with respect to T, according to an embodiment of the invention.

To detect a volume jump, a simple threshold $T_{vol}(t)$ on $$\frac{d(\text{volume}(c_{s,t}))}{dt},$$

the first derivative of the volume, can be used. If, at a given threshold t', the first derivate of the volume is greater than $T_{vol}(t)$, the volume jump is reached. To make the volume jump detection more accurate and more robust, $T_{vol}(t)$ can be adjusted using the threshold of the previous VOI ($t_{last}$). Indeed, $t_{last}$ provides a good estimate of when the volume jump should occur in the current VOI. The formula to adjust $T_{vol}(t)$ is given by:

$$T_{vol}(t) = T_{low} + (T_{high} - T_{low})\left(\frac{\arctan(\alpha(t_{last} - t))}{\pi} + 0.5\right),$$

where $T_{high}$ is the higher volume threshold (typically 5% of the VOI), $T_{low}$ is the lower volume threshold (typically 1% of the VOI) and $\alpha$ is a parameter controlling the slope of the function. In an exemplary embodiment of the invention, a value of $\alpha$=0.01 is used. $T_{vol}(t)$ varies between $T_{high}$ and $T_{low}$ in a strictly decreasing manner. FIG. 8 illustrates the variation of $T_{vol}(t)$ with respect to T. The example shown in the figure plots the percentage fraction of $T_{vol}(t)$ of the total VOI as a function of intensity value, in HU, for $t_{last}$=150, $T_{low}$=2%, $T_{high}$=5% and $\alpha$=0.01. If the current threshold t used in the flooding process is much greater than $t_{last}$, it is improbable that a volume jump will occur. A high $T_{vol}(t)$ (close to $T_{high}$) can be used to avoid under-segmentation. Conversely, while t approaches $t_{last}$, a volume jump is expected to occur, so $T_{vol}(t)$ is lowered to ensure the robustness of the method. Note that intensity statistics from the former vessel segment (mean and standard deviation) could be computed to adjust the volume jump threshold in a similar manner.

The example given using a volume attribute is for expository purposes and is non-limiting. Other vessel-related shape attributes include a local ball measure or the moment of inertia. These measures are dedicated to vessels and should result in more accurate and more robust characterization, although these measures can induce an increased computation overhead. One skilled in the art can easily modify the technique for detecting a volume discontinuity to detect discontinuities in other attribute measures.

Although a local segmentation method according to an embodiment of the invention does not require any data preprocessing, in particularly noisy cases, a smoothing step can help avoid under-segmentation of weak branches continuations. Since it is desired to preserve the vessel boundaries while working locally, a bilateral filtering approach can be used to obtain non-interative on-the-fly anisotropic smoothing of visited voxels. However, this preprocessing step can affect the performance in terms of execution time, depending on the amount of smoothing needed.

A bilateral filter is similar to anisotropic diffusion in the sense that it tends to smooth homogeneous regions while preserving edges. Its implementation uses both spatial and intensity domains to determine the smoothed value of a point by means of a nonlinear combination of nearby image values. Near values in both spatial and intensity domains obtain higher weights in the combination. A bilateral filter according to an embodiment of the invention is defined as follows:

$$h(x) = k(x)^{-1} \int_{w \in \omega} f(w) c(x,w) s(f(x), f(w)) dw,$$

where $h(x)$ is the output of the filter for a point x, $\omega$ is the set of points considered in the combination, $c(x,w)$ measures the spatial similarity, and $s(f(x), f(w))$ measures the intensity similarity. The normalization factor $k(x)$ is defined by:

$$k(x) = \int_{w \in \omega} c(x,w) s(f(x), f(w)) dw.$$

The size of the kernel used for $c(x,w)$ determines the local domain covered by the filter ($\omega$). $c(x,w)$ and $s(f(x), f(w))$ are typically implemented using discrete Gaussian kernels but any distance metric can be used for $c(x,w)$ and $s(f(x), f(w))$.

Since the initial segmentation $c^*_{s,t}$ was obtained by a mechanism equivalent to a simple region-growing, it may still contain some limited leakage, as well as irregular contours and holes. To clean the local segmentation mask, the following post-processing steps (FIG. 4, step 45) can be successively applied:

(1) a hole-filling process to eliminate holes within the segmented mask;

(2) a morphological opening (erosion then dilation) to disconnect remaining leakage; and (3) a smoothing of the surface.

To perform post-processing steps efficiently, a discrete, fast level-set implementation can be used. This curve evolution scheme can be seen as an extreme narrow-banding technique, using only two lists of voxels, $L_{in}$ and $L_{out}$, representing respectively the inner and outer boundaries of the object. The curve evolution is achieved by switching points between those two lists, without solving a partial differential equation, reinitializing the level-sets, or otherwise taking the image into account. This framework provides a simple and efficient way of performing a range of binary operations on the initial segmentation mask, such as hole filling and disconnecting leakage. For example, a morphological dilation corresponds to moving the curve outwards, i.e. switching points from $L_{out}$ to $L_{in}$. The smoothing step comprises convolving $L_{in}$ and $L_{out}$ with a Gaussian kernel.

The fast level-set curve evolution scheme uses only two lists of voxels, $L_{in}$ and $L_{out}$, defined as follows:

$L_{out} = \{x | x$ is outside the object and $\exists y \in N(x)$ such that y is inside the object and a scalar function $\Phi(y) < 0\}$;

$L_{in}=\{x|x$ is inside the object and $\exists y \in N(x)$ such that y is outside the object and a scalar function $\Phi(y)<0\}$;

where $N(x)$ represents the neighborhood of x. The curve evolution is achieved by switching points between $L_{in}$ and $L_{out}$ and by updating level values. This is done without solving any partial differential equation or reinitializing $\Phi$. Morphological closing operations are performed by growing outward a number n of iterations and then growing inward the same number n of iterations. Smoothing is performed by convolving the two lists with Gaussian kernels to decide whether or not to switch points.

Figure 9:
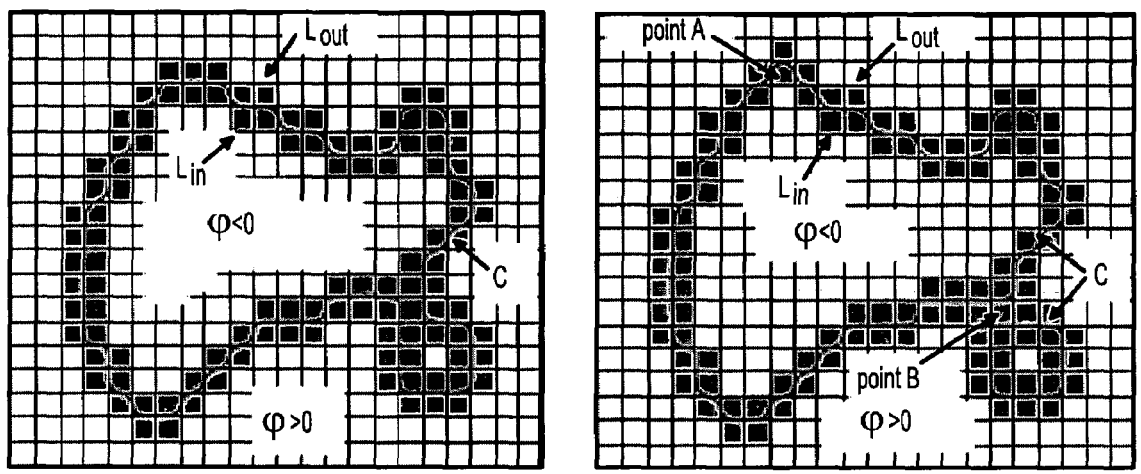
FIG. 9 illustrates a fast level-set representation according to an embodiment of the invention.

FIG. 9 is an illustration of a fast level-set representation according to an embodiment of the invention. As shown in the figure, the curve C is represented implicitly by the inner ($L_{in}$) and outer ($L_{out}$) lists. A level set is a curve generated by the intersection of a surface representing scalar-valued function $\Phi$ by a plane determined by the zero-values of that function. In the non-limiting example depicted in the figure, $\Phi<0$ inside the curve and $\Phi>0$ outside the curve. Evolution is achieved by switching points between those two lists. For example, in going from the left panel to the right panel, point A moved from $L_{out}$ to $L_{in}$ and B from $L_{in}$ to $L_{out}$.

A fast level-set technique according to an embodiment of the invention is used to perform binary operations on the curve itself, without any data convection term. Since this curve evolution scheme only considers object boundaries and since the object is generally significantly smaller than the VOI, these operations are, in the average case, more efficient than implementations that require scanning the entire VOI. In addition, the initialization of the level-set is provided by the flooding process that keeps track of the outer boundary $L_{out}$ for each threshold t.

Once the initial segmentation $c^*_{s,t}$ has been post-processed, a final local segmentation mask is obtained by retrieving the voxels in the connected component attached to the seed point s, constrained to an inner sphere S_V of a diameter $d(S)<s(V)$ with $s(V)$ the edge length of the squared VOI V. Note that post-processing may have disconnected leaking parts from the initial segmentation. According to an embodiment of the invention, values of $d(S)=0.75s(V)$ are used. By restricting the local segmentation to that part in the sphere, undesirable boundary effects can be avoided, such as local leaking in surrounding structures lying just at the boundaries of V.

The local result is then combined with the global segmentation mask (FIG. 4, step 46). Note that local segmentation results can overlap (up to 62.5% with $d(S)=0.75s(V)$), inducing redundant computation. The Boolean operator OR can be used to merge local segmentation results within the global one. Although this operation is efficient, it can induce discontinuities in the global result at the interfaces between local blocks. Indeed, two overlapping local segmentations may not have been obtained with the same exact threshold. This effect, which remains limited in practice, can be corrected by post-processing the final result using, for example, the smoothing technique described in Algorithms 1 to 5.

Re-seeding Procedure

Once a local segmentation result has been merged with the global mask, an algorithm according to an embodiment of the invention looks for new seed points. Ideally, new seed points are approximately located at the center of the vessel, lying just outside the inner sphere S. It is desired to have only one seed point per vessel cross section traversing S. To meet such requirements, a topology-preserving skeletonization process is applied which extracts an approximate vessel centerline (FIG. 4, step 47).

A skeletonization process according to an embodiment of the invention performs thinning through successive erosions of the object, checking for end- and non-simple points. End points are the points of the object which have only one 26-adjacent neighbor in the object. These typically lie on the vessel extremities. Simple points are defined as the object points whose removal would not alter the topology of the object. Hence, the thinning process does not remove end points and non-simple points in order to obtain a topology-preserving skeleton.

In order characterize simple points in 26-connectivity, use O to represent the object, $N_n(P)$ to represent the n-neighborhood of P, $N^*_n(P)=N_n(P)-\{P\}$ to represent the n-neighborhood of P without P, $C^*(P)$ represent the number of 26-connected components 26-adjacent to P in $O \cap N^*_{26}(P)$, and $\overline{C}(P)$ the number of 6-connected components 6-adjacent to P in $\overline{O} \cap N_{18}(P)$. Then, simple points can be characterized by:

$$C^*(P)=1 \text{ and } \overline{C}(P)=1.$$

This way, simple point characterization is efficiently performed through connected components labeling. According to an embodiment of the invention, thinning can be performed by a fast level set method where simple and non-end points are removed by switching points inward until convergence.

The result of this thinning process is a one voxel thick, 26-connected and topology preserving 1D curve, referred to as a medial line, that approximates the central axis of the vessel. It is desired to find the point s' on the medial line that is the closest from the seed point s. From s', the medial line is followed until it crosses the inner sphere boundary. These crossing points are tagged as next seed points (FIG. 4, step 48). Vessel branchings are naturally handled through the detection of several new seeds.

Note that this thinning procedure can result in shaky medial lines, with numerous false branchings. In practice, this can lead to clusters of new seed points instead of isolated ones. Fortunately, this has little affect on the results, since seed points lying in an already segmented area are automatically discarded. However, this effect could be solved with graph operations, like computing the minimum spanning tree of the medial line and pruning branches smaller than a given length, as are known in the art.

Results

Figure 10:
FIG. 10 depicts exemplary segmentation results on CT datasets, according to an embodiment of the invention.
Figure 12:
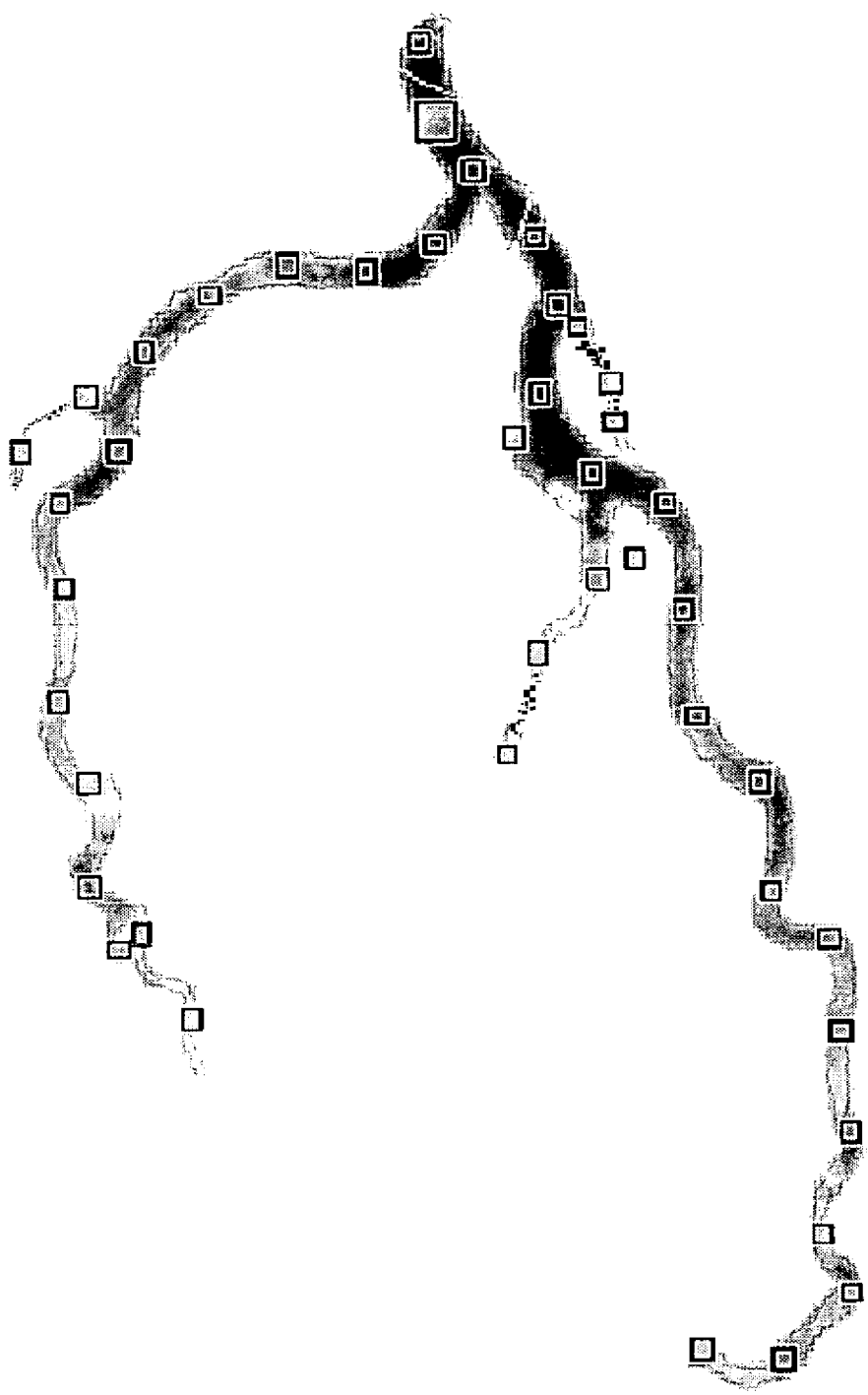
FIG. 12 illustrates tree coherence, according to an embodiment of the invention.

Results depend of course on the quality of the material. An initially noisy dataset will make any segmentation, even manual, much harder. However, a method according to an embodiment of the invention succeeded in extracting automatically the main branches (LCA, LCX and RCA) in most cases. It usually segments accurately most of the visible arterial tree. Result samples are given in FIG. 10 and the table of FIG. 11. FIG. 10 depicts volume-rendered results for 2 different datasets. The left column depicts the left coronary/circumflex artery tree (LCA/LCX), while the right column depicts the right coronary artery (RCA). The table depicted in FIG. 11 displays the result statistics for FIG. 10. Computation times were obtained on a 1.5 GHz Pentium IV computer with 1 GB RDRAM. Datasets are respectively composed of 208 and 338 slices of 512×512 voxels, with an intra-slice resolution of 0.43 and 0.30 mm per voxel and an inter-slice resolution of 0.5 and 0.4 mm per voxel. These results were obtained fully automatically, with only two user-provided seed points in the RCA and in the LCA/LCX branch respectively. FIG. 12 illustrates the coherence of an artery tree generated by a segmentation method according to an embodiment of the invention. The original user-provided seed point at the center of the original VOI, indicted in the larger box second from the top of then figure. The new, automatically retrieved seed points (the mother, smaller boxes) lie on the vessel centerline and could be used to easily estimate the vessel direction and check the tree coherence.

The combination of automatic local threshold selection and morphological operations results in robust and accurate segmentation. The final segmentation closely approximates actual vessel boundaries, while being smooth, hole- and leak-free. The amount of post-processing (smoothing and closing operations) naturally balances robustness and accuracy. Too much post-processing will produce cleaner and smoother results, but at the risk of discarding thin branches. Too small structuring elements will preserve both thin branches and local leakage. The choice of these elements then mostly depends on the quality of the acquisition and on the degree of accuracy needed.

An algorithm according to an embodiment of the invention proved its robustness in various conditions of noise, contrast and resolution by successfully segmenting a wide range of vessel sizes, even in presence of anatomical anomalies such as calcifications, aneurysms and stenosis. However, as any local tracking approach, it sometimes stops prematurely when reaching severe stenosis.

An algorithm according to an embodiment of the invention works locally and directly on the original data grid, and uses only basic operations implemented in an efficient manner. Therefore, an algorithm according to an embodiment of the invention achieves performance as detailed in the table of FIG. 11. The computation time is directly related to the number of local segmentations and visited voxels. The memory overhead induced is also limited, under 10 MB on average. Performance can be further improved by avoiding redundant computation. In additional, parallelization of the algorithm is straightforward thanks to the local segmentation and re-seeding architecture that follows exactly the tree structure of the coronary arteries. At vessel branchings, the local segmentation step generates several new seed points (one per branch) which lead to totally independent segmentation processes. Furthermore, nothing but the size of the local VOI is specifically tuned for CT coronaries in an approach according to an embodiment of the invention. More than just an ad-hoc solution for CT coronary segmentation, an algorithmic framework according to an embodiment of the invention can be successfully and efficiently applied to a wide range of vessel segmentation problems.

Implementation

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 13:
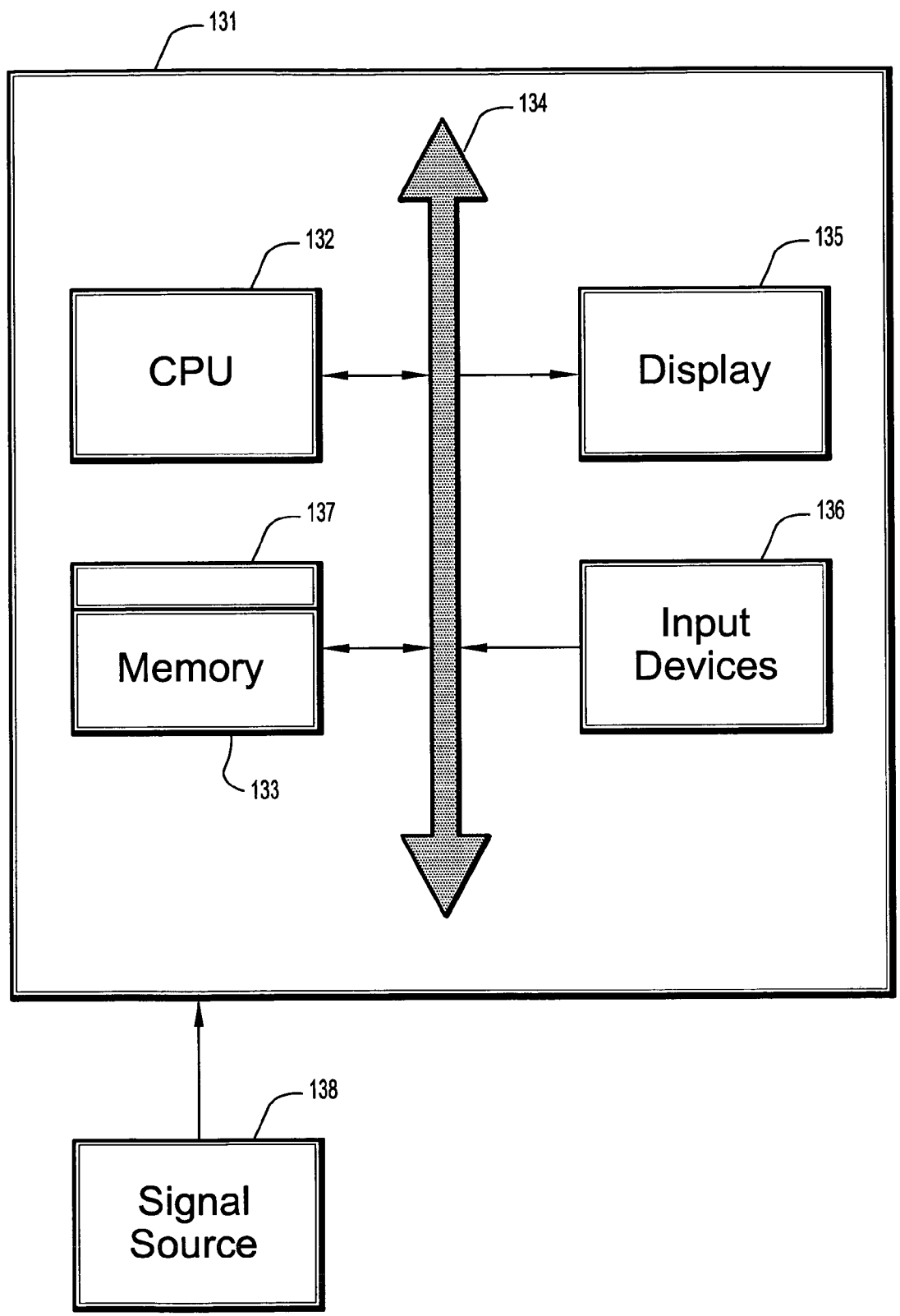
FIG. 13 is a block diagram of an exemplary computer system for implementing a coronary segmentation method according to an embodiment of the invention.

FIG. 13 is a block diagram of an exemplary computer system for implementing a cardiac segmentation according to an embodiment of the invention. Referring now to FIG. 13, a computer system 131 for implementing the present invention can comprise, inter alia, a central processing unit (CPU) 132, a memory 133 and an input/output (I/O) interface 134. The computer system 131 is generally coupled through the I/O interface 134 to a display 135 and various input devices 136 such as a mouse and a keyboard. The support circuits can include circuits such as cache, power supplies, clock circuits, and a communication bus. The memory 133 can include random access memory (RAM), read only memory (ROM), disk drive, tape drive, etc., or a combinations thereof. The present invention can be implemented as a routine 137 that is stored in memory 133 and executed by the CPU 132 to process the signal from the signal source 138. As such, the computer system 131 is a general purpose computer system that becomes a specific purpose computer system when executing the routine 137 of the present invention.

The computer system 131 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of segmenting coronary vessels in digitized cardiac images comprising the steps of:

providing a digitized cardiac image comprising a plurality of intensities corresponding to a domain of points on an N-dimensional grid;

providing a seed point in said digitized image;

selecting a volume-of-interest about said seed point;

performing a local segmentation in said volume-of-interest, including initializing a connected component with said seed point and a threshold intensity value to the intensity of the seed point, adding a point to said connected component if said point is adjacent to said connected component and if the intensity of said point is greater than or equal to the threshold value, lowering said threshold intensity value, and computing an attribute value of said connected component, wherein if a discontinuity in said attribute value is detected, said local segmentation is terminated, wherein a local segmentation mask of a vessel is obtained and smoothing points added to said connected component with a bilateral filter.

2. The method of claim 1, wherein said steps of adding a point to said connected component, lowering said threshold intensity value, and computing an attribute value are repeated for all points in said volume of interest until said segmentation is terminated.

3. The method of claim 1, wherein if an attribute value discontinuity is not detected, discarding the volume of interest.

4. The method of claim 1, wherein said attribute value is selected from a list including a volume of said connected component, a local ball measure of said connected component, and a moment of inertia of said connected component.

5. The method of claim 1, wherein detecting an attribute value discontinuity comprises calculating a first derivative of said attribute with respect to said threshold intensity value, comparing said first derivative value to a threshold derivative value, wherein if said first derivative value is greater than said threshold derivative value, a discontinuity has been detected.

6. The method of claim 5, further comprising adjusting said threshold derivative value based on a current threshold intensity value and a previous threshold intensity value.

7. The method of claim 1, further comprising eliminating any holes in said segmentation mask, disconnecting leakage points from said segmentation mask, wherein said leakage points are not part of said vessel, and smoothing the surface of said segmentation mask.

8. The method of claim 7, wherein eliminating holes and disconnecting leakage points from said segmentation mask comprises initializing an outer boundary of said segmentation mask, initializing an inner boundary of said segmentation mask, switching points between said outer boundary and said inner boundary for a predetermined number of iterations, and convolving said inner boundary and said outer boundary with a Gaussian kernel.

9. The method of claim 1, wherein said local segmentation mask is obtained by retrieving points in said connected component that are inside a sphere contained within said volume-of-interest.

10. The method of claim 9, comprising merging said local segmentation mask with a global segmentation mask.

11. The method of claim 1, further comprising selecting a new seed point, wherein selecting a new seed point comprises thinning said segmentation mask by removing points that are not end points or are not non-simple points wherein a medial line is obtained, wherein an end point has only one 26-adjacent neighbor point and a non-simple point is a point whose removal alters the topology of the segmentation mask, selecting point on the medial line that is closest to said seed point, following said medial line until said medial line crosses an inner sphere contained within said volume-of-interest, and selecting said crossing point as the new seed point.

12. The method of claim 11, wherein said steps of selecting a volume-of-interest, performing a local segmentation, and selecting a new seed point are repeated until a new seed point cannot be selected.

13. A method of segmenting coronary vessels in digitized cardiac images comprising the steps of:
providing a digitized cardiac image comprising a plurality of intensities corresponding to a domain of points on an N-dimensional grid;
providing a seed point in said digitized image;
selecting a volume-of-interest about said seed point;
performing a local segmentation in said volume-of-interest wherein a local segmentation mask of a vessel is obtained; and
selecting a new seed point, including thinning said segmentation mask by removing points that are not end points or are not non-simple points wherein a medial line is obtained, wherein an end point has only one 26-adjacent neighbor point and a non-simple point is a point whose removal alters the topology of the segmentation mask, selecting point on the medial line that is closest to said seed point, following said medial line until said medial line crosses an inner sphere contained within said volume-of-interest, and selecting said crossing point as the new seed point, and wherein said steps of selecting a volume-of-interest, performing a local segmentation, and selecting a new seed point are repeated until a new seed point cannot be selected.

14. The method of claim 13, wherein performing a local segmentation further comprises:
initializing a connected component with said seed point and a threshold intensity value to the intensity of the seed point;
adding a point to said connected component if said point is adjacent to said connected component and if the intensity of said point is greater than or equal to the threshold value;
lowering said threshold intensity value; and
computing an attribute value of said connected component, wherein if a discontinuity in said attribute value is detected, said local segmentation is terminated.

15. A program storage device readable by a computer, tangibly embodying a program of instructions executable by the computer to perform the method steps for segmenting coronary vessels in digitized cardiac images, said method comprising the steps of:
providing a digitized cardiac image comprising a plurality of intensities corresponding to a domain of points on an N-dimensional grid;
providing a seed point in said digitized image;
selecting a volume-of-interest about said seed point;
performing a local segmentation in said volume-of-interest, including initializing a connected component with said seed point and a threshold intensity value to the intensity of the seed point, adding a point to said connected component if said point is adjacent to said connected component and if the intensity of said point is greater than or equal to the threshold value, lowering said threshold intensity value, and computing an attribute value of said connected component, wherein if a discontinuity in said attribute value is detected, said local segmentation is terminated, wherein a local segmentation mask of a vessel is obtained and eliminating any holes in said segmentation mask, disconnecting leakage points from said segmentation mask, wherein said leakage points are not part of said vessel, and smoothing the surface of said segmentation mask.

16. The computer readable program storage device of claim 15, wherein said steps of adding a point to said connected component, lowering said threshold intensity value, and computing an attribute value are repeated for all points in said volume of interest until said segmentation is terminated.

17. The computer readable program storage device of claim 15, wherein if an attribute value discontinuity is not detected, discarding the volume of interest.

18. The computer readable program storage device of claim 15, wherein said attribute value is selected from a list including a volume of said connected component, a local ball measure of said connected component, and a moment of inertia of said connected component.

19. The computer readable program storage device of claim 15, wherein detecting an attribute value discontinuity comprises calculating a first derivative of said attribute with respect to said threshold intensity value, comparing said first derivative value to a threshold derivative value, wherein if said first derivative value is greater than said threshold derivative value, a discontinuity has been detected.

20. The computer readable program storage device of claim 19, the method further comprising adjusting said threshold derivative value based on a current threshold intensity value and a previous threshold intensity value.

21. The computer readable program storage device of claim 15, the method further comprising smoothing points added to said connected component with a bilateral filter.

22. The computer readable program storage device of claim 15, wherein eliminating holes and disconnecting leakage points from said segmentation mask comprises initializing an outer boundary of said segmentation mask, initializing an inner boundary of said segmentation mask, switching points between said outer boundary and said inner boundary for a predetermined number of iterations, and convolving said inner boundary and said outer boundary with a Gaussian kernel.

23. The computer readable program storage device of claim 15, wherein said local segmentation mask is obtained by retrieving points in said connected component that are inside a sphere contained within said volume-of-interest.

24. The computer readable program storage device of claim 23, the method further comprising merging said local segmentation mask with a global segmentation mask.

25. The computer readable program storage device of claim 15, the method further comprising selecting a new seed point, wherein selecting a new seed point comprises thinning said segmentation mask by removing points that are not end points or are not non-simple points wherein a medial line is obtained, wherein an end point has only one 26-adjacent neighbor point and a non-simple point is a point whose removal alters the topology of the segmentation mask, selecting point on the medial line that is closest to said seed point, following said medial line until said medial line crosses an inner sphere contained within said volume-of-interest, and selecting said crossing point as the new seed point.

26. The computer readable program storage device of claim 25, wherein said steps of selecting a volume-of-interest, performing a local segmentation, and selecting a new seed point are repeated until a new seed point cannot be selected.

* * * * *